(12) United States Patent
Fujimoto (10) Patent No.: US 11,549,011 B2
(45) Date of Patent: Jan. 10, 2023

(54) POLY(PHENYLENE) WITH HIGH ION SELECTIVITY FOR USE IN ANION EXCHANGE MEMBRANES

(71) Applicant: National Technology & Engineering Solutions of Sandia, LLC, Albuquerque, NM (US)

(72) Inventor: Cy Fujimoto, Albuquerque, NM (US)

(73) Assignee: National Technology & Engineering Solutions of Sandia, LLC, Albuquerque, NM (US)

(*) Notice: Subject to any disclaimer, the term of this patent is extended or adjusted under 35 U.S.C. 154(b) by 0 days.

(21) Appl. No.: 17/569,777

(22) Filed: Jan. 6, 2022

(65) Prior Publication Data

US 2022/0127450 A1 Apr. 28, 2022

Related U.S. Application Data

(62) Division of application No. 16/578,629, filed on Sep. 23, 2019, now abandoned.

(51) Int. Cl.
*C08L 65/02* (2006.01)
*C08G 61/10* (2006.01)
*B01J 41/09* (2017.01)

(52) U.S. Cl.
CPC ............ *C08L 65/02* (2013.01); *B01J 41/09* (2017.01); *C08G 61/10* (2013.01); *C08G 2261/143* (2013.01); *C08G 2261/148* (2013.01)

(58) Field of Classification Search
CPC .......... C08G 18/0828; C08G 2261/516; C08G 2261/1452; C08G 2261/722; H01B 1/122; H01M 8/1025
See application file for complete search history.

(56) References Cited

U.S. PATENT DOCUMENTS

| | | |
|---|---|---|
| 8,809,483 B1 | 8/2014 | Hibbs |
| 10,294,325 B2 | 5/2019 | Fujimoto |
| 2018/0194892 A1* | 7/2018 | Fujimoto ............... C08J 5/2262 |

OTHER PUBLICATIONS

Hibbs, M.R. et al., "Synthesis and Characterization of Poly(phenylene)-Based Anion Exchange Membranes for Alkaline Fuel Cells", Macromolecules (2009), 42. pp. 8316-8321.
Hibbs, M.R., "Alkaline Stability of Poly(phenylene)-Based Anion Exchange Membranes with Various Cations", Journal of Polymer Science, Part B: Polymer Physics (2013), 51, pp. 1736-1742.
Park, E.J., "Alkaline Stability of Quaternized Diels-Alder Polyphenylenes", Macromolecules (2019), 52, pp. 5419-5428.

* cited by examiner

*Primary Examiner* — Shane Fang
(74) *Attorney, Agent, or Firm* — Kevin Bieg (57) ABSTRACT

A method for synthesizing a poly(phenylene) with high ion selectivity comprises dissolving an alkyl halide poly(phenylene) in a polar aprotic solvent to form a nonaqueous solution and adding an anhydrous nucleophile to the nonaqueous solution to replace the halide of the alkyl halide poly(phenylene) with a cationic group of the nucleophile. The poly(phenylene) can be used in anion exchange membranes.

8 Claims, 7 Drawing Sheets

POLY(PHENYLENE) WITH HIGH ION SELECTIVITY FOR USE IN ANION EXCHANGE MEMBRANES

CROSS-REFERENCE TO RELATED APPLICATION

This is a divisional application of U.S. application Ser. No. 16/578,629, filed Sep. 23, 2019, which is incorporated herein by reference.

STATEMENT OF GOVERNMENT INTEREST

This invention was made with Government support under Contract No. DE-NA0003525 awarded by the United States Department of Energy/National Nuclear Security Administration. The Government has certain rights in the invention.

FIELD OF THE INVENTION

The present invention relates to polymer electrolyte membranes and, in particular, to a poly(phenylene) with high ion selectivity that can be used in anion exchange membranes.

BACKGROUND OF THE INVENTION

There is a large interest in clean energy, electrochemical technologies that require a membrane that controls cell efficiency and impacts total cell cost. In particular, there is commercial interest for membranes for redox flow batteries (RFBs). RFBs can use nonaqueous solvents that can provide higher energy densities via larger operating potentials and higher concentrations of redox active species in the electrolyte, as compared to aqueous electrolytes. Semi-permeable membranes are used to facilitate ion transport necessary to maintain charge balance during battery operation. Accordingly, membranes with low ionic conductivities will adversely affect RFB performance, limiting the current density and power output, while reducing voltage efficiency. Further, ion-selective membranes are employed to prevent crossover between the redox active species in the anolyte and catholyte, which would lead to decreased battery capacity (electrochemical yield) over time. In particular, anion exchange membranes (AEMs) are required to prevent the crossover between cationic redox active species in the anolyte and catholyte. AEMs comprise a polymer that contains bound positive charges. The AEM allows anions to pass but rejects cations. However, commercially available membranes do not meet cost and performance targets. In particular, many currently available membranes show poor performance in terms of ionic conductivity and/or mechanical stability (i.e., solvent resistance). Further, if the ionic selectivity can be enhanced, electrolyte crossover may be minimized, and coulombic efficiency and electrochemical yields may be improved. Therefore, a need remains for low cost, high performance AEMs that can be easily functionalized for specific flow battery chemistries.

SUMMARY OF THE INVENTION

The present invention is directed to a method for synthesizing a poly(phenylene) with high ion selectivity, comprising dissolving an alkyl halide poly(phenylene) in a polar aprotic solvent to form a nonaqueous solution and adding an anhydrous nucleophile to the nonaqueous solution to replace the halide of the alkyl halide poly(phenylene) with a cationic group of the nucleophile. The nonaqueous solution can be heated mildly to speed the reaction. For example, the polar aprotic solvent can comprise n-methyl pyrrolidone, dimethyl acetamide, dimethyl sulfoxide or dimethyl formamide. For example, the nucleophile can comprise an amine, such as trimethyl amine, triethyl amine, or tripropyl amine. For example, the nucleophile can comprise imidazole, piperidine, or phosphine. At least one of the unsubstituted pendant aryl rings of the poly(phenylene) can be functionalized with an alkyl group to further improve ion selectivity.

BRIEF DESCRIPTION OF THE DRAWINGS

The detailed description will refer to the following drawings, wherein like elements are referred to by like numbers.

DETAILED DESCRIPTION OF THE INVENTION

Figure 1:
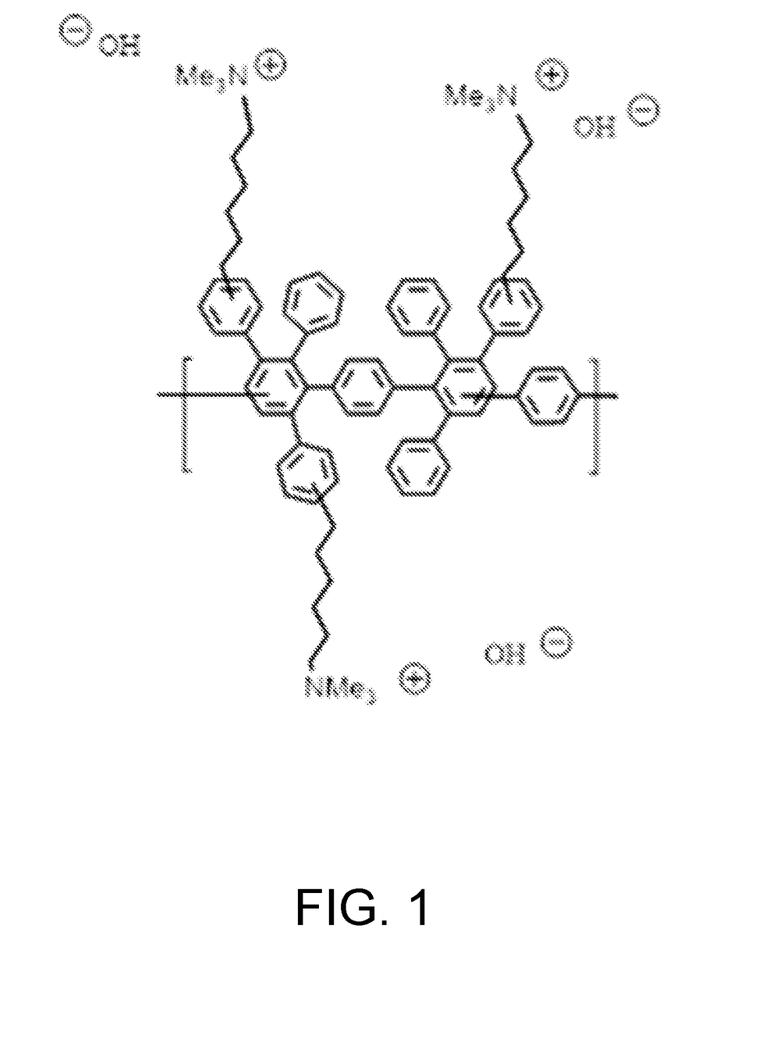
FIG. 1 is a schematic illustration of the chemical structure of a Diels Alder polyphenylene (DAPP) having quaternary ammonium function groups.

In FIG. 1 is shown the chemical structure of Diels Alder poly(phenylene) [DAPP] that has been functionalized with quaternary ammonium groups. DAPP comprises a polymer backbone made entirely of phenyl or benzene units which gives this polymer high chemical stability, and the stiff backbone (low backbone rotation) provides high temperature operation. See U.S. Pat. No. 8,809,483, issued Aug. 19, 2014, which is incorporated herein by reference. This combination of physical properties is not found commonly in other polymer systems. The synthesis of anionic DAPP has been previously described. See M. Hibbs, *J. Polym. Sci., Part B: Polym. Phys.* 51, 1736 (2013); and M. R. Hibbs et al., *Macromolecules* 42, 8316 (2009), which are incorporated herein by reference. The backbone DAPP can be synthesized by the Diels-Alder reaction of bis-tetraphenyl cyclopentadienone with p-bis(ethynyl)benzene, with a wide range of functionalities. A common cationic functional group that can be attached to the side chains of the phenyl rings is quaternary ammonium, as shown in FIG. 1. DAPP can be quaternized by, first, synthesizing brominated alkyl ketone-functionalized DAPP by reacting DAPP with 6-bromohexanoyl chloride in the presence of aluminum chloride. The ketone group of the polymer can be reduced to the methyl group by the reaction with trifluoroacetic acid and triethyl silane. The bromohexyl DAPP can then be aminated by immersion in trimethyl amine solution. In this example, the ion content or ion exchange capacity (IEC) of the membrane is dictated by the amount of ammonium groups attached onto the DAPP backbone. The ammonium group enables hydroxide conduction when the ammonium functionalized poly(phenylene) is used as a hydroxide exchange membrane, as shown in the example in FIG. 1.

Figure 2:
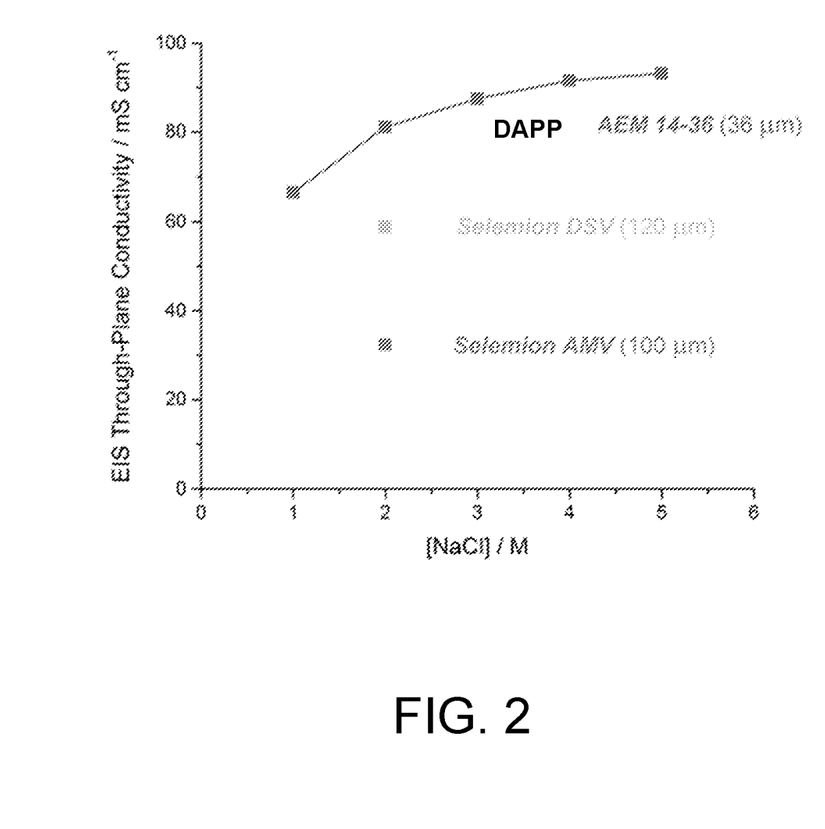
FIG. 2 is a graph of electrochemical impedance spectroscopy (IES) measurements of the ion conductivity of DAPP compared to commercially available AEMs.

FIG. 2 shows the ion conductivity of DAPP compared to some commercially available AEMs. DAPP has 3 and 7 times lower resistance than Selemion AMV and Selemion DSV (Asahi Glass Company), respectively, in various sodium chloride concentrations. This low ion transport resistance is vital in applications such as in alkaline fuel cells and electrolysis, since resistance is inversely proportional to overall cell efficiencies. However, in other battery applications, such as in flow batteries, the membranes need not only low resistance, but also high ion selectivity. In flow batteries, the membrane needs to allow electrolyte ions to be transported for charge balance (low ion resistance), but since the electroactive materials (anolyte and catholyte) are dissolved in the electrolyte medium, the membrane also needs to prevent the transport of these anolyte/catholyte species in order to prevent self-discharge (crossover of anolyte/catholyte). A catholyte typically used in aqueous organic flow batteries is a ferrocene complex. In this case, it is desirable for the membrane to prevent the transport of the ferrocene. However, DAPP shows the highest diffusion of $6.3 \times 10^{-9}$ $cm^2/s$, whereas across Selemion DSV the diffusion rate was found to be $1.4 \times 10^{-12}$ $cm^2/s$, about 4500 times lower than it was for DAPP.

Figure 3:
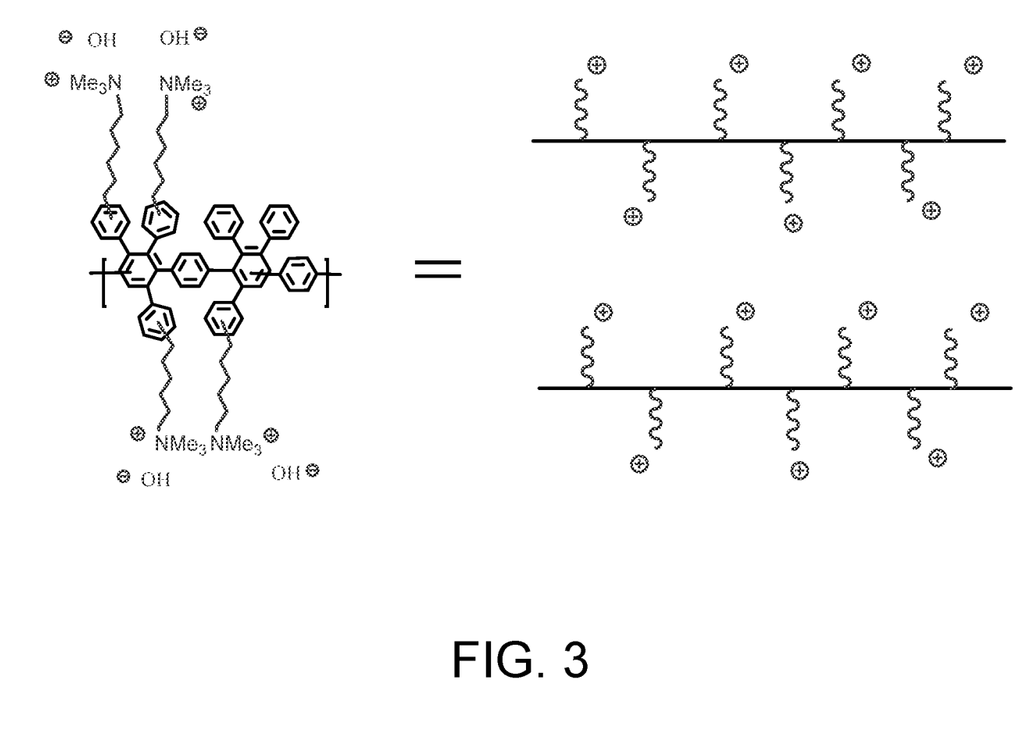
FIG. 3 is a schematic illustration of a prior AEM showing the very bulky substituents of the prior DAPP structure, which causes inefficient chain stacking.

The structure of the prior DAPP is shown in FIG. 3. Membranes made of this polymer have high conductivity, but low ion selectivity. The structure of the prior DAPP is bulky, with a stiff poly(phenylene) backbone and long alkyl chains terminated with the ammonium group on the pendant phenyls that increases the bulk around the polymer backbone and prevents effective polymer chain packing, resulting in large free volume (space between the polymer chains). This open space allows for effective ion transport, but also a large enough pathway for other species such as anolyte/catholyte, which is not desirable.

Figure 4:
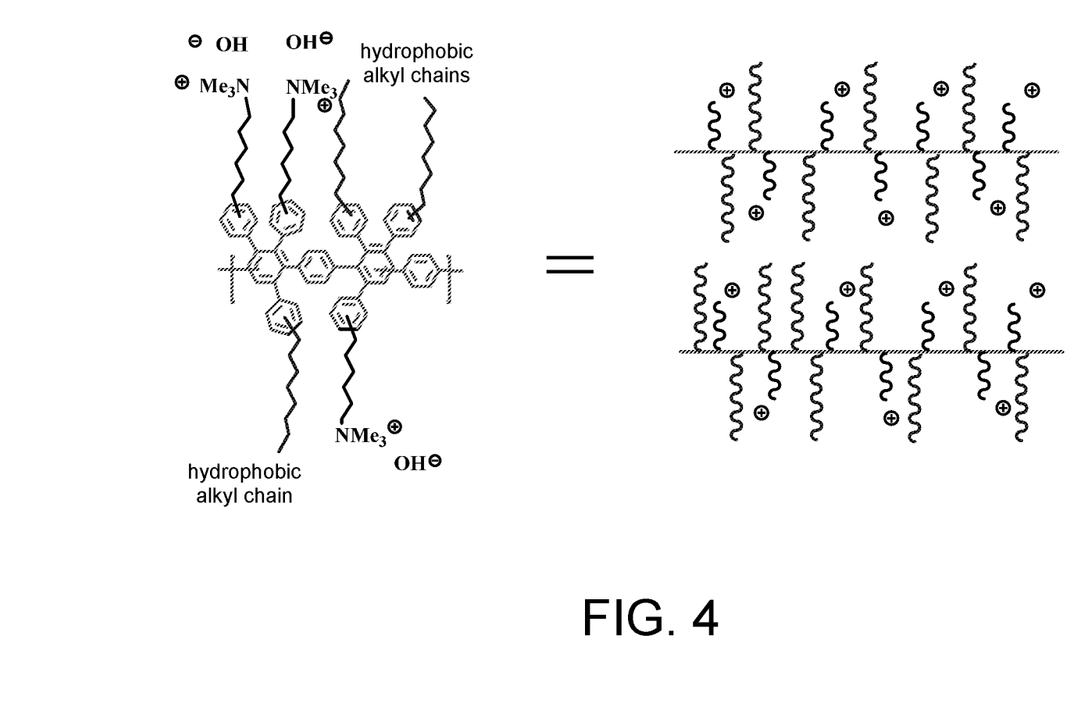
FIG. 4 is a schematic illustration of an AEM of the present invention, comprising a DAPP with added alkyl groups to fill any free volume between polymer chains.

The structure of the poly(phenylene) of an embodiment of the present invention is shown in FIG. 4. In addition to quaternization of alkyl halide groups, the unsubstituted pendant aryl rings of the poly(phenylene) structure can be functionalized with long, hydrophobic alkyl chains via an alkylation reaction with an alkyl halide in the presence of aluminum chloride. The alkyl group can be methyl, propyl, or a longer hydrocarbon, such as octyl. Therefore, the structure can comprise two types of alkyl groups, one terminated with ammonium groups and the other with hydrophobic alkyl chains. Although the polymer chains still will not be able to stack efficiently due to the steric bulk attached to the polymer backbone, any free volume will be occupied by the hydrophobic alkyl chains. In membranes made of this polymer, the hydrophobic alkyl chains act as a barrier for large ion transport such as anolyte/catholyte, since it will fill in the open gaps between polymer chains. By blocking or slowing down the transport of electroactive species, this AEM will improve battery capacity retention.

Figure 5:
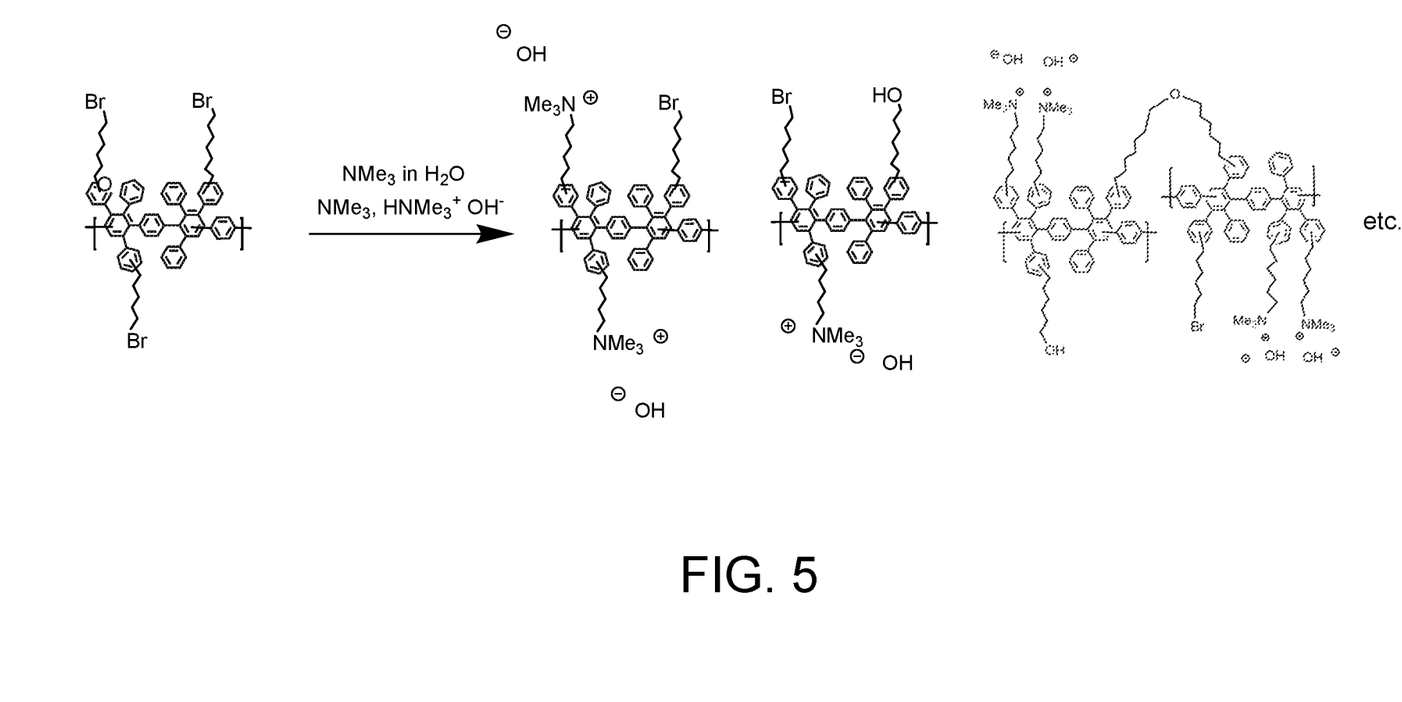
FIG. 5 is an illustration of a prior synthetic method to convert bromide groups of alkyl bromide poly(phenylene) to quaternary ammonium, as described in U.S. Pat. No. 8,809,483.

Previously as described and shown in FIG. 5, to attach the ammonium group onto the polymer, bromohexyl DAPP can be cast as a film and then soaked in a solution of aqueous trimethyl amine. However, trimethyl amine has an equilibrium in water into trimethyl ammonium hydroxide. Therefore, when bromohexyl DAPP is soaked in this solution there is not complete conversion into ammonium groups, but rather a mixture. This is not desirable since the targeted ionic groups (trimethylhexylammonium) are variable and the attached alcohol of the unconverted groups can begin to crosslink the polymer (i.e., a form of polymer degradation, as shown in FIG. 5. See E. J. Park et al., *Macromolecules* 52, 5419 (2019), which is incorporated herein by reference. This crosslinking results in a film that cannot be dissolved. Moreover, this crosslinking becomes an issue with the polymers since the hydrophobic component (long alkyl chain) prevents the films from absorbing trimethyl amine in the substitution reaction, thus leading to a lower ion content or ion exchange capacity (IEC) than theoretical.

Figure 6:
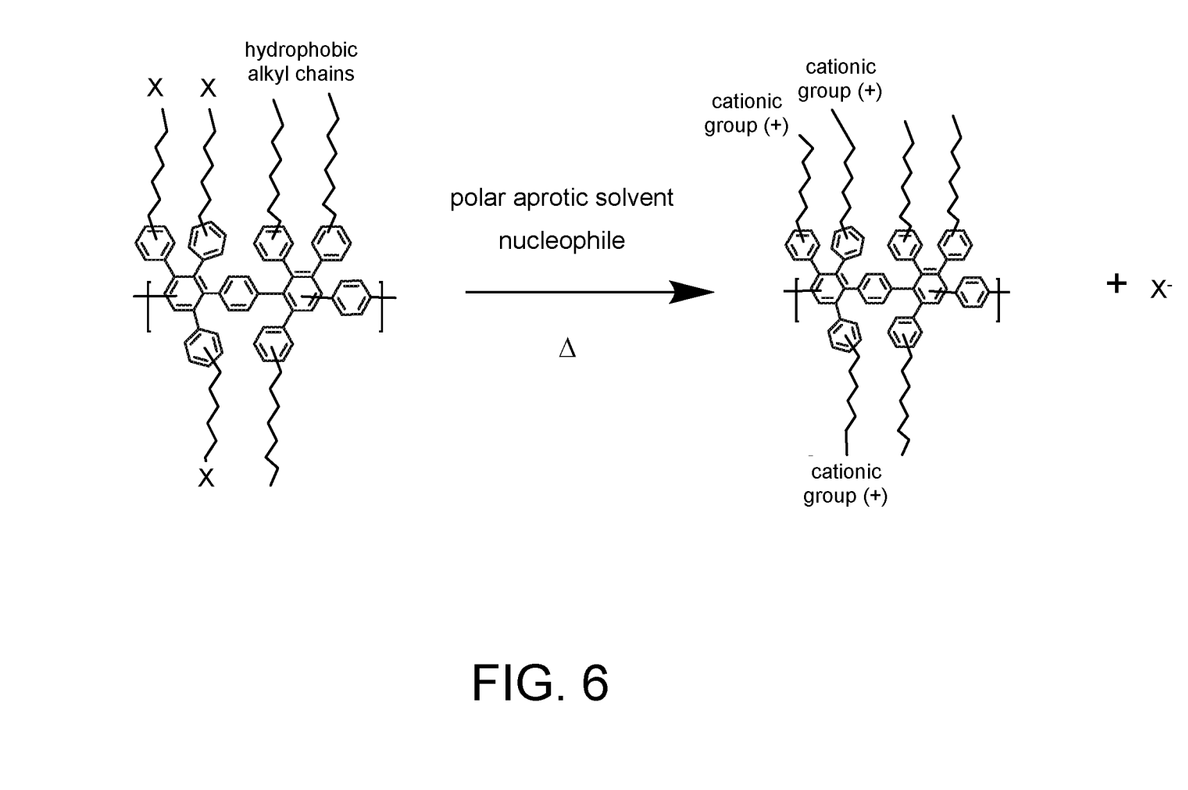
FIG. 6 is an illustration of the general synthesis method of the present invention to convert the halide groups of alkyl halide poly(phenylene) to cationic functional groups.

According to a general synthesis illustrated in FIG. 6, complete nucleophilic substitution of an alkyl halide functionalized poly(phenylene) can be accomplished when the alkyl halide poly(phenylene) is dissolved in a polar aprotic solvent and an anhydrous nucleophile is added to the polymeric solution. The nonaqueous solution can be mildly heated (depending on the nucleophile type) to complete the nucleophilic substitution. The halogen (X) leaving group is replaced on the alkyl spacer with the cationic group of the nucleophile. A variety of alkyl halide groups can be used, including alkyl bromides and alkyl chlorides. Common polar aprotic solvents that can be used include n-methyl pyrrolidone (NMP), dimethyl acetamide (DMAc), dimethyl sulfoxide (DMSO), and dimethyl formamide (DMF). Likewise, a variety of nucleophiles can be used, including amines (e.g., trimethyl amine, triethyl amine, and tripropyl amine), imidazole, piperidine, and phosphine. These nucleophiles convert the halide to the chemically stable cationic groups ammonium, imidazolium, piperidinium, and phosphonium, respectively. The reaction can be run at room temperature but is slow. Therefore, the reaction can be run at a slightly elevated temperature, but less than 200° C., depending on the boiling point of the nucleophile. For example, the boiling point of trimethyl amine is 40° C., so the reaction can be run at 50 to 60° C. with a reflux condenser to keep the amine from escaping.

Figure 7:
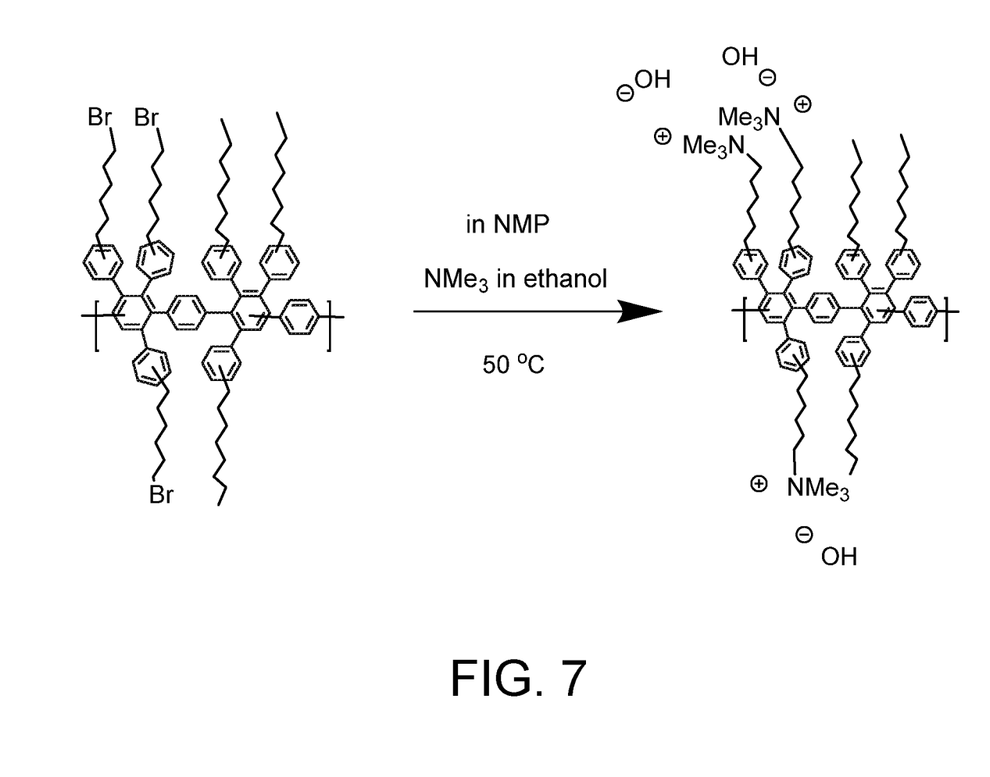
FIG. 7 is an illustration of an exemplary method for replacing the bromide groups of alkyl bromide poly(phenylene) with alkyl ammonium groups.

In FIG. 7 is shown the synthesis of an exemplary AEM material according to the invention. Complete bromine substitution can be accomplished when the alkyl bromo poly(phenylene) is dissolved in NMP, trimethyl amine in anhydrous alcohol is added to the polymeric solution, and the nonaqueous solution is mildly heated to convert the alkyl bromo groups into quaternary ammonium groups. As an example, bromoalkylated DAPP was dissolved in NMP at a concentration of 5% by weight, followed by adding excess trimethyl amine (10 equiv of amine to alkyl bromide) in anhydrous ethanol dropwise in order to prevent the polymer from precipitating from solution. The solution was then be heated to 50° C. to complete the amination reaction. The polymer had an experimental IEC that matches the theoretical ion content (2.7 meq/g).

The present invention has been described as a poly(phenylene) with high ion selectivity that can be used in anion exchange membranes. It will be understood that the above description is merely illustrative of the applications of the principles of the present invention, the scope of which is to be determined by the claims viewed in light of the specification. Other variants and modifications of the invention will be apparent to those of skill in the art.

I claim:

1. A method for synthesizing a poly(phenylene) with high ion selectivity, comprising:
providing an alkyl halide poly(phenylene), wherein at least one pendant aryl ring is functionalized with a hydrophobic alkyl group comprising a methyl, propyl, or a longer chain hydrocarbon, dissolving the alkyl halide poly(phenylene) in a polar aprotic solvent to form a nonaqueous solution, and adding an anhydrous nucleophile to the nonaqueous solution to replace the halide of the alkyl halide poly(phenylene) with a cationic group of the nucleophile.

2. The method of claim 1, further comprising heating the nonaqueous solution to a temperature of less than 200° C.

3. The method of claim 1, wherein the polar aprotic solvent comprises n-methyl pyrrolidone, dimethyl acetamide, dimethyl sulfoxide or dimethyl formamide.

4. The method of claim 1, wherein the nucleophile comprises an amine.

5. The method of claim 4, wherein the amine comprises trimethyl amine, triethyl amine, or tripropyl amine.

6. The method of claim 1, wherein the nucleophile comprises imidazole, piperidine, or phosphine.

7. The method of claim 1, wherein the longer chain hydrocarbon comprises an octyl.

8. The method of claim 1, wherein the cationic group comprises ammonium, imidazolium, piperidinium, or phosphonium.

\* \* \* \* \*